United States Patent [19]

Stratton

[11] 4,287,835
[45] Sep. 8, 1981

[54] SLIPPER TRAY AND FOOTREST

[76] Inventor: David W. Stratton, 1901 Tradewinds La., Newport Beach, Calif. 92660

[21] Appl. No.: 881,496

[22] Filed: Jul. 31, 1978

[51] Int. Cl.³ .............................................. A47B 85/00
[52] U.S. Cl. ........................................ 108/26; 108/50; 188/5; 248/161; 297/439
[58] Field of Search ............... 297/170, 172, 174, 423, 297/433, 438, 439; 108/1, 27, 28, 50, 150, 146; 5/332; 248/403; 188/5

[56] References Cited

U.S. PATENT DOCUMENTS

| | | | |
|---|---|---|---|
| 47,831 | 5/1865 | Hussey | 108/26 |
| 1,228,105 | 5/1917 | Funk | 297/438 |
| 1,440,329 | 12/1922 | Aimé | 297/438 X |
| 1,652,774 | 12/1927 | Fraser et al. | 108/1 X |
| 1,916,537 | 7/1933 | Smith | 108/50 X |
| 2,248,369 | 7/1941 | Ludersen | 297/439 X |
| 2,433,969 | 1/1948 | Wood | 297/433 X |
| 2,897,910 | 8/1959 | Steely et al. | 188/5 X |
| 2,955,645 | 11/1960 | Cramer | 182/107 |
| 3,044,577 | 7/1962 | Lotz | 188/5 |
| 3,232,251 | 2/1966 | Hughes | 108/50 |
| 3,361,437 | 1/1968 | Loftis | 188/5 X |

FOREIGN PATENT DOCUMENTS 749046 7/1933 France ............................ 297/423

Primary Examiner—Roy D. Frazier
Assistant Examiner—Peter A. Aschenbrenner

[57] ABSTRACT

A tray is attached to the base of an over-the-bed table normally used by bed-ridden patients. This tray provides a convenient and readily available place for the patient to place his or her slippers to prevent them from being shoved under the bed or across the room. It also provides the patient with a convenient footrest when using the table either while sitting on the edge of the bed or in a chair. One version of the tray is pivotable in order that the patient may pivot it with his or her feet to the most comfortable angle. When the tray is pivoted, a method is provided for locking the table such that it will not move away from the patient due to the horizontal force vector resulting therefrom. Another version of the tray may be raised or lowered to suit the comfort of the patient.

1 Claim, 15 Drawing Figures

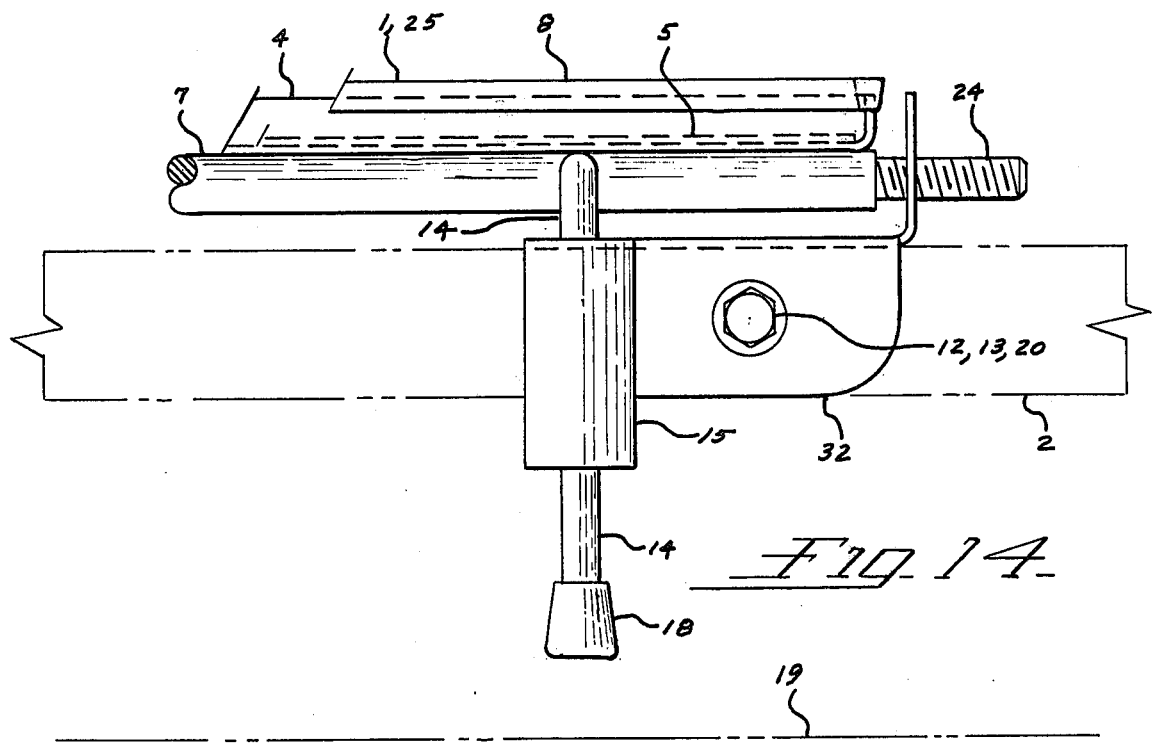
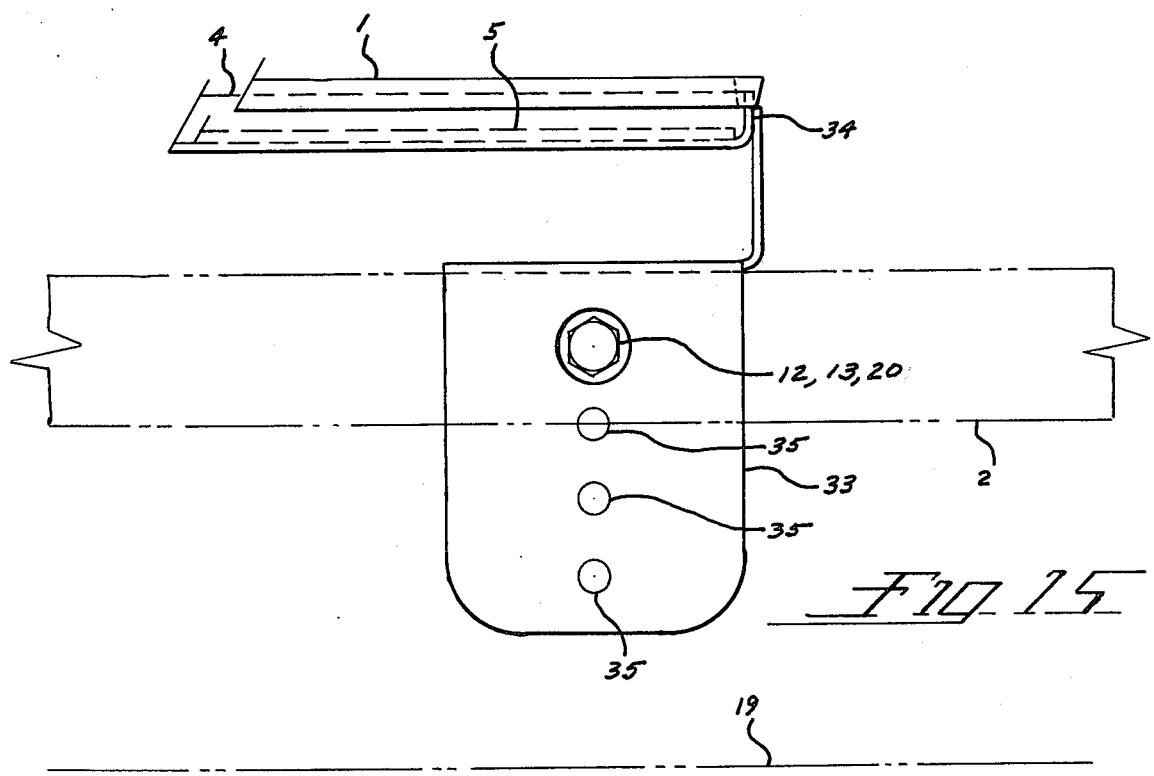

SLIPPER TRAY AND FOOTREST

BACKGROUND OF THE INVENTION

Any individual who has spent any time in a hospital, convalescent home or been bedridden at home has experienced the inconvenience of having the base of the over-the-bed table pushing his or her slippers either under the bed or or across the room, thus making it necessary at times to call for assistance in order to retrieve said slippers. The present over-the-bed table does not have adequate space on the top for books or a cosmetic case to which the patient might want ready access. In addition, the tables do not provide a comfortable footrest for the patient's feet either while sitting at the table on the edge of the bed or while sitting in a chair. This invention is intended to overcome these discomforts and inconveniences.

SUMMARY OF THE INVENTION

Accordingly, it is an object of the invention to provide a simple, unique, and readily available tray for the placement of his or her slippers of normally bedridden patients. The invention can also be used as a footrest or accessory holder.

The invention accomplishes this by means of a tray which mounts to the bottom structure of any over-the-bed table by means of clamps. The invention further includes a means by which it can be pivoted about its longitudinal center line so as to be used as a footrest. Such pivoting action is accomplished by the patient simply pressing down with the toes or heels of his or her feet. Such pivoting action automatically locks the over-the-bed table in place by means of spring loaded plungers what are forced down against the floor, thereby preventing the table from moving away from the patient due to the resulting horizontal force vector imposed on the table by such pivoting action. Such pivoting action may be accomplished in either direction about the pivot center line depending upon which side of the table the patient chooses to sit.

A means is provided by which the friction of the pivot point is adjustable to suit the strength or weight of the patient. Such friction is made adjustable by the use of spring loaded cap nuts on the pivot ends.

A means is also provided by which one version of the invention may be raised or lowered to accommodate the patient's height.

BRIEF DESCRIPTION OF THE DRAWING

Other and further important objects, advantages and aspects of the invention will become apparent from the following detailed description taken in conjunction with the accompanying drawing in which:

FIG. 4 and FIG. 3 are considered typical of the installation at both ends of the slipper tray and of all but one version of the slipper tray and footrest.

In this view can also be seen the vertical flange around the edge of the pan, its rubber or vinyl protective molding and the rubber or vinyl non-skid matting.

Figure 6:
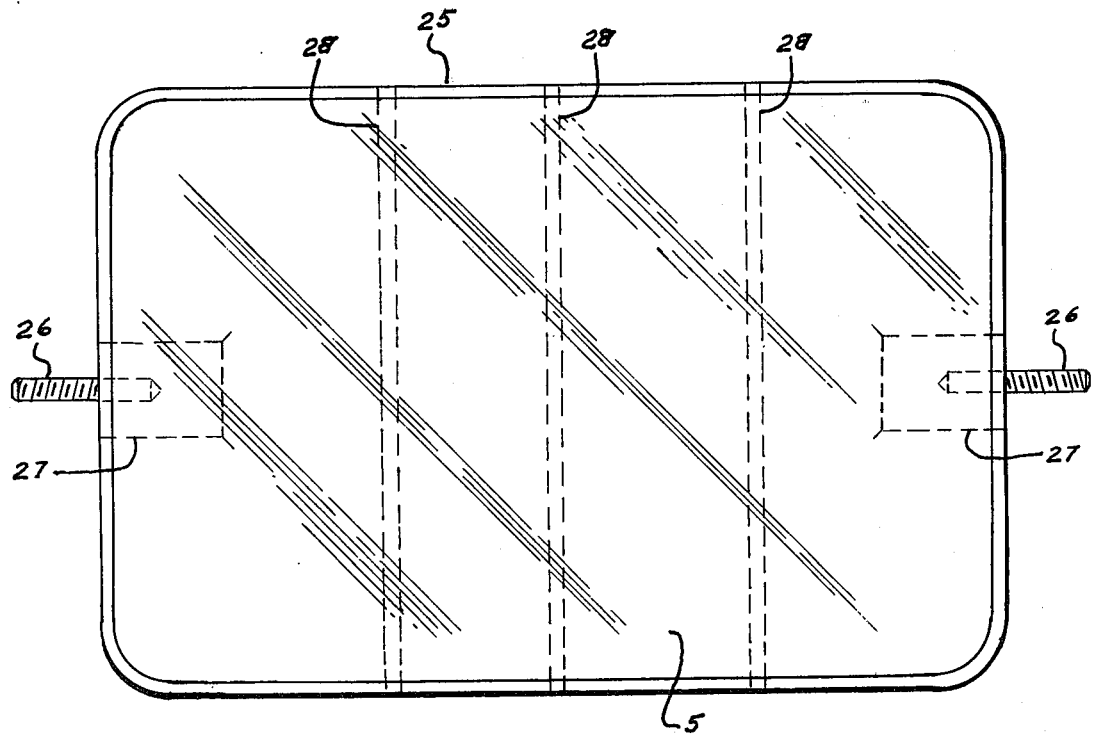
Figure 7:
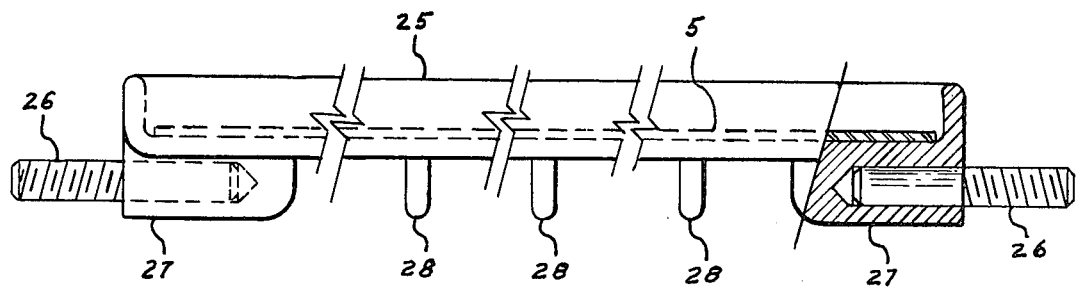

FIG. 6 is a top view of the same invention, slipper tray and footrest, cast from non-ferrous metal or plastic. The entire top of the tray is again covered with a rubber or vinyl non-skid matting. The center pivot bar has been replaced by bosses cast on the bottom of the tray on the pivot center line at each end so as to take the stainless steel threaded inserts. This is shown in FIG. 7. Also, due to the thicker wall of the vertical peripheral flange, it's edge has been cast round, thus eliminating the need for the rubber or vinyl protective molding. Also shown are three webs on the underside of the tray which provide the tray with rigidity when cast from non-ferrous metal or plastic materials.

Figure 3:
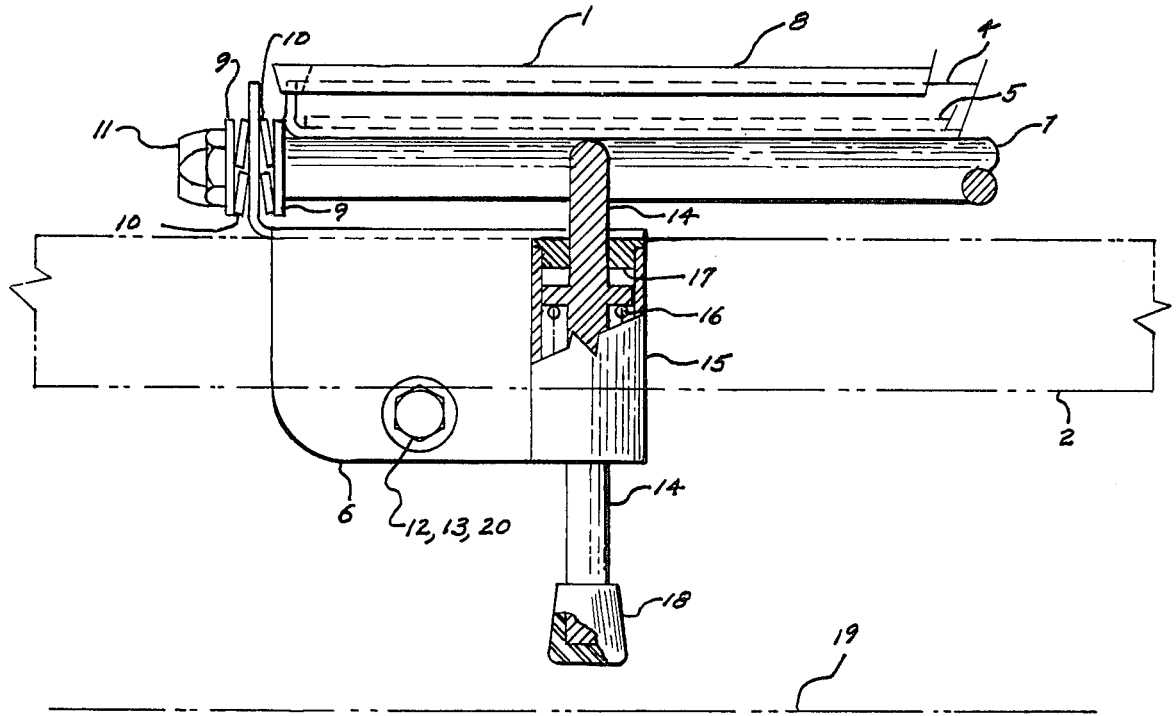
FIG. 3 is a side view of one end of the slipper tray mounted to the horizontal bar of the over-the-bed table by means of the inverted "U" shaped bracket with a vertical end flange through which the pivot bar protrudes. In this view can be seen the screw, washers, and cap nut which are used to attach the tray to the mounting bracket as well as providing adjustment for the amount of pivotal friction desired. This FIG. 3 also shows the spring loaded plunger which locks the table in place when the tray is pivoted. These plungers (two on each side) also act to level the tray when it is not being used as a footrest.
Figure 4:
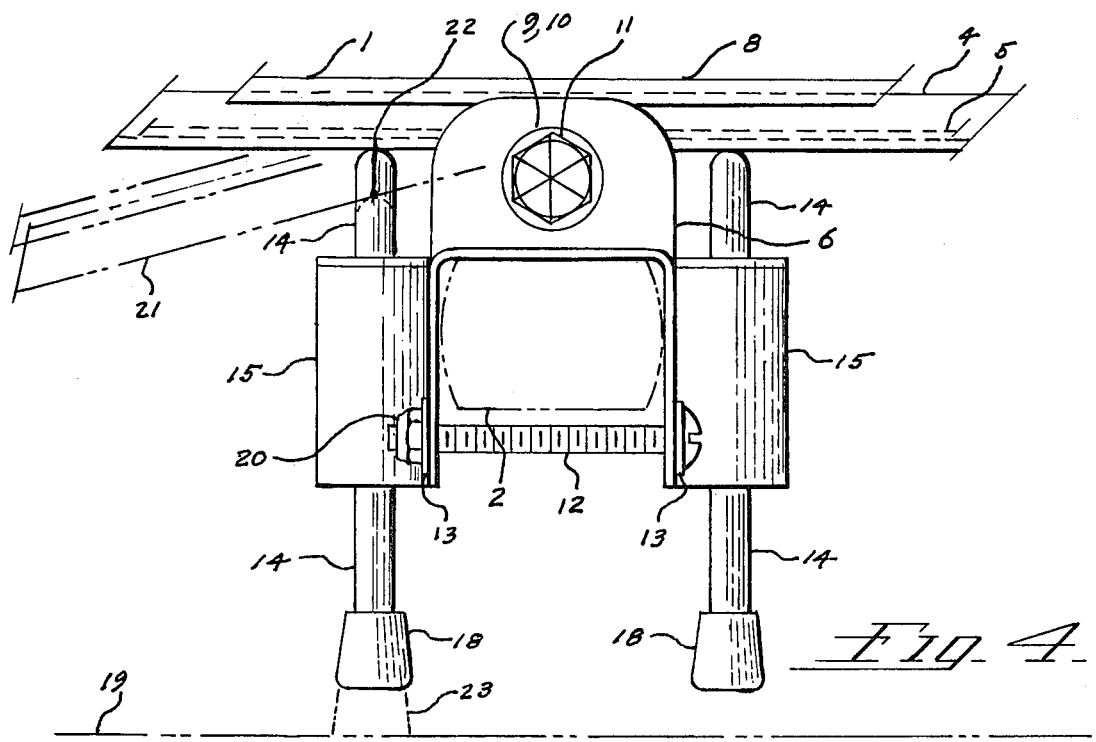
FIG. 4 is an end view of the tray and its mounting bracket. In this view can be seen the screw which passes under the table horizontal bar, together with the locknut and washers which clamp the bracket to the table bar. This FIG. 4 also shows the extent to which the tray can pivot in either direction. It also shows the spring loaded plungers which lock the table in place when the tray is pivoted. The mounting bracket at both ends of the slipper tray are identical. Thus, this
Figure 5:
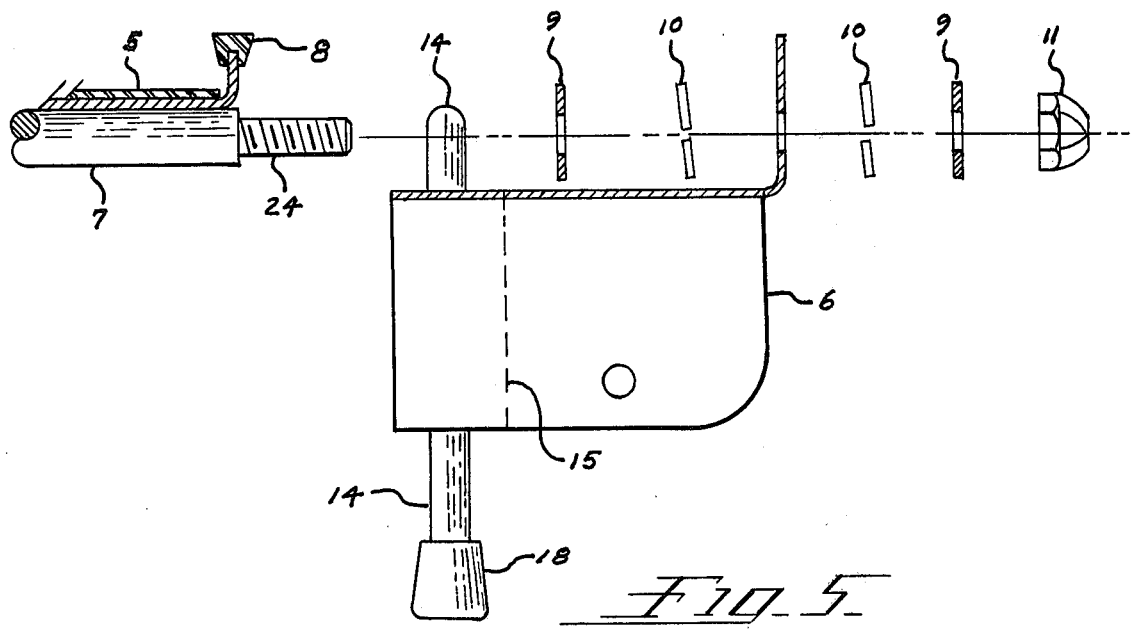
FIG. 5 is an expanded view of the pivot joint assembly. In this expanded view can be seen the sequence of assembly to the threaded pivot bar which is afixed to the bottom of the slipper tray. First there is a plain washer, then a lock washer, the mounting bracket, another lock washer, another plain washer and finally the cap nut. The use of the cap nut is to protect the patient from scratching himself or herself on the raw edge of the threaded pivot bar.

As noted, the installation of this version of the slipper tray and footrest is identical to that shown in FIGS. 3, 4, and 5.

FIG. 7 is a side view of the slipper tray showing the two cast bosses, protruding stainless steel threaded inserts, and the three webs used to provide rigidity to the tray.

Figure 8:
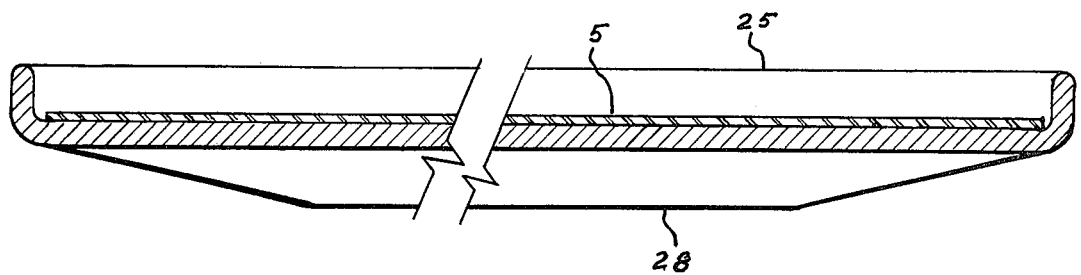

FIG. 8 is a cross section through the tray showing the webs used to provide rigidity to the tray when cast from non-ferrous or plastic materials.

Figure 9:
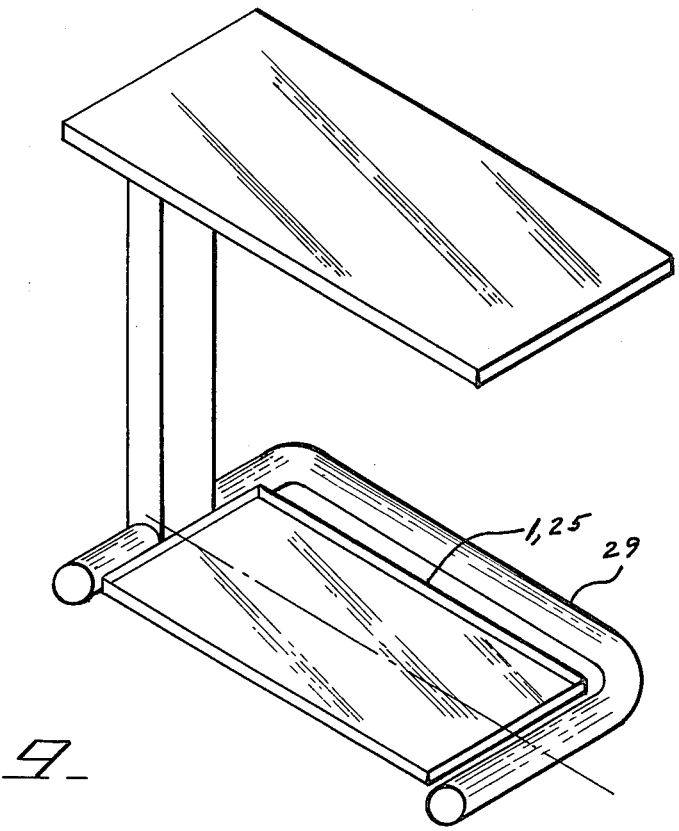

FIG. 9 is a perspective view of a different variation of the over-the-bed table. In this case the base of the table is a "U" shaped round tubing. Thus, in order to mount the slipper tray, the design of the mounting brackets only have to be changed. The slipper tray and its method of attachment to the mounting brackets are identical to that shown in FIGS. 2 through 5.

Figure 10:
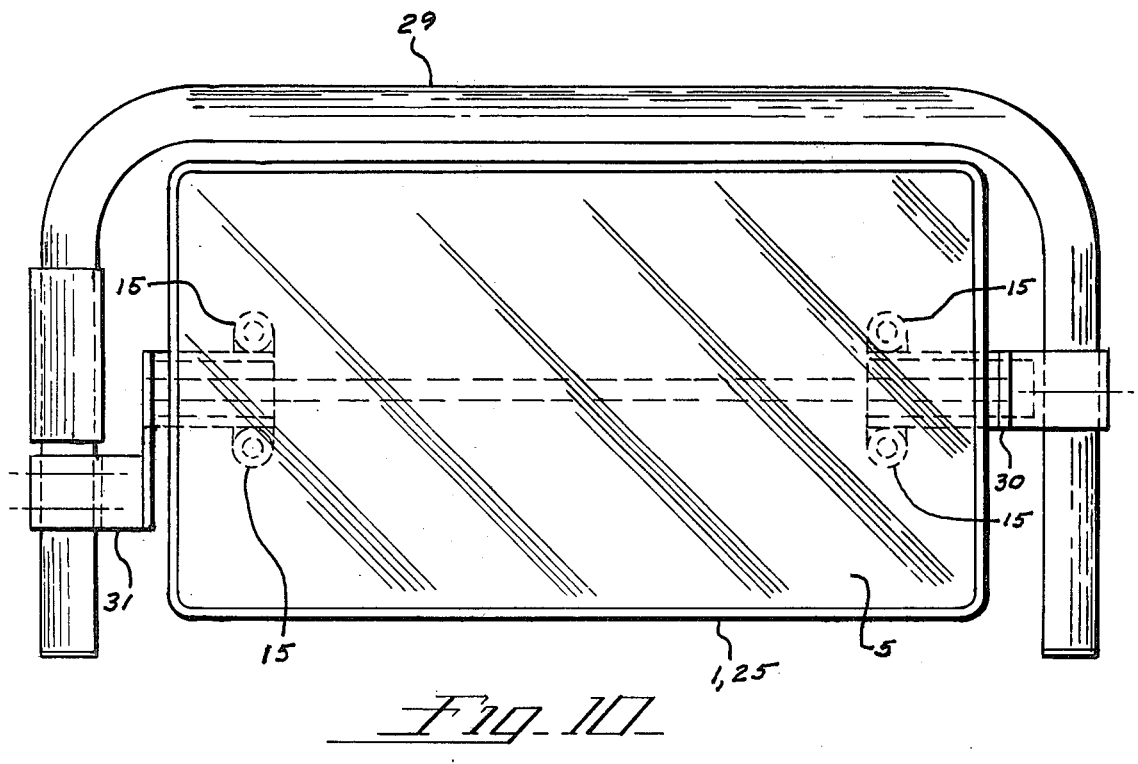

FIG. 10 shows a plan view of the slipper tray mounted inside the "U" shaped base. One of the attach brackets had to be offset to accept the slipper tray pivot bolt due to the location of the vertical table support beam. This is shown better in FIG. 12.

Figure 11:
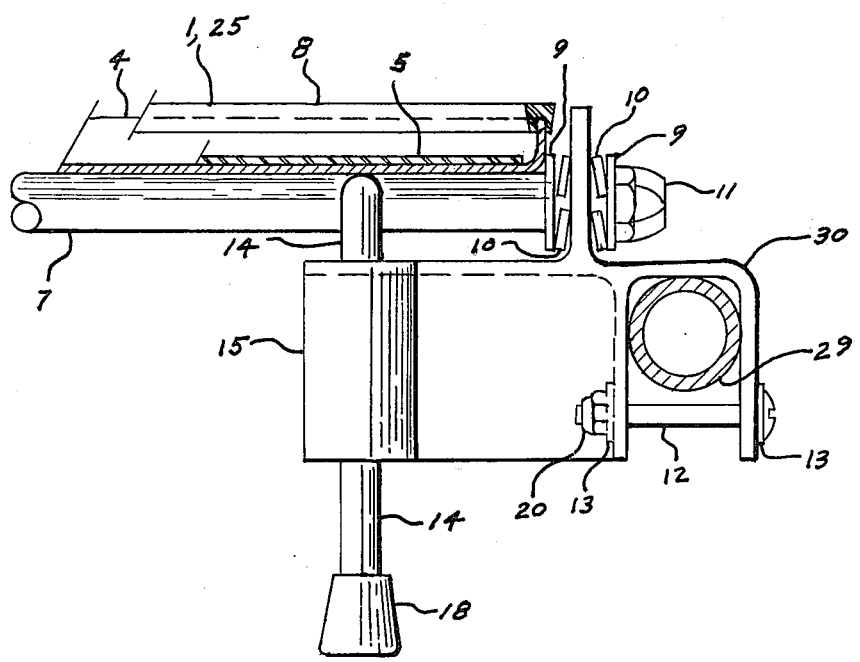

FIG. 11 is a side view of the on-center mounting bracket shown on the right hand side in FIG. 10. This FIG. 11 shows the revised bracket needed to accept the tubular base. Otherwise, the tray mounting, pivoting, and locking design is identical to that shown in FIGS. 3, 4, and 5.

Figure 12:
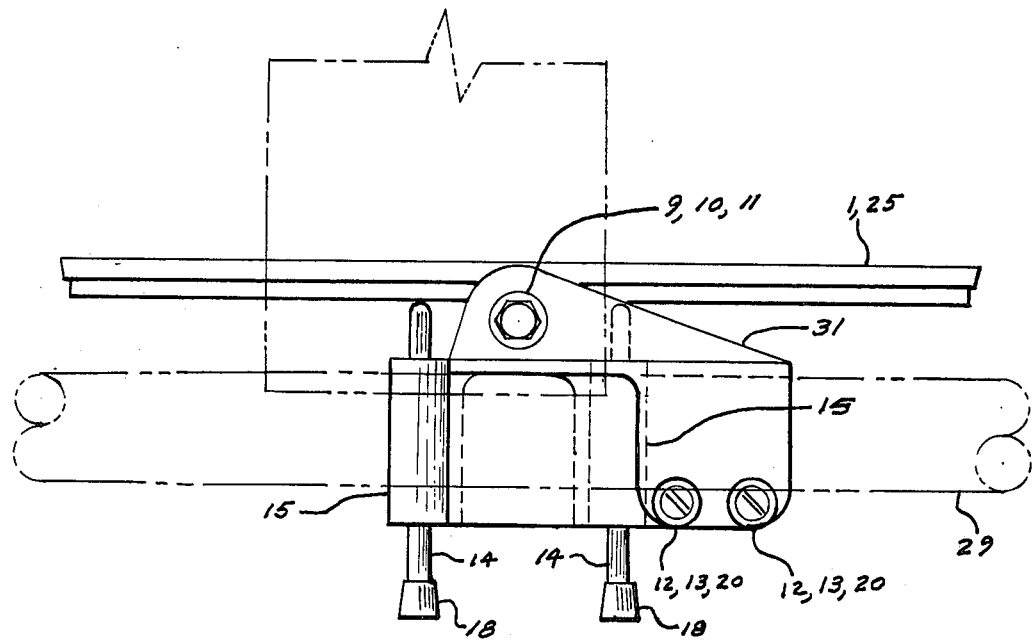

FIG. 12 is an end view which shows the offset mounting bracket. It also shows the use of two sets of screws, washers, and lock-nuts instead of one set as used in the previous design. The use of two sets of screws, etc. are necessary in this design in order to offset the torque load that is applied to the bracket. The use of two clamping screws also prevents possible tilting of the bracket on the tubular base. The bracket at the other end needs only one clamping screw since it is on center with the pivot point.

Figure 13:
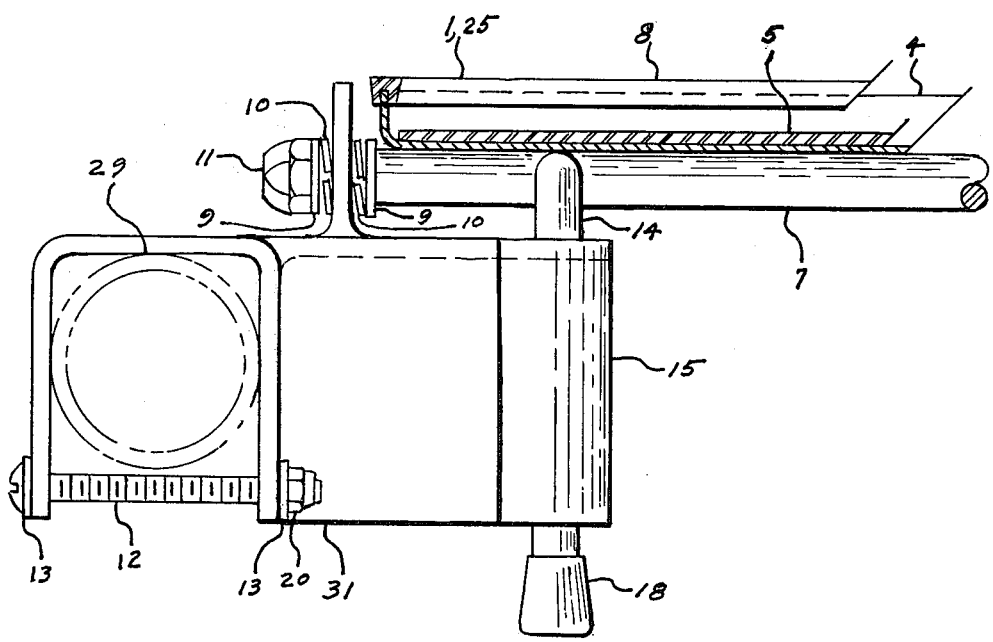

FIG. 13 is a side view showing the method of mounting the offset bracket shown in FIG. 12 to the tubular base. The method of mounting the tray to the bracket, and the table locking devices remain the same as that shown in FIGS. 3, 4, and 5.

FIG. 14 shows a different method of attaching the tray mounting bracket to the table. In this case, the mounting screw passes through the longitudinal bar of the "H" shaped base rather than under it as shown in all previous FIGS. The nuts and washers required to install the tray to the bracket are not shown in this FIG. since they remain unchanged from that shown in previous FIGS. The main difference in this design as compared to that shown in FIG. 3 is the fact that the over-the-bed table must be reworked by drilling the two holes (one at each end) through the table bar, which may be objectionable at the users facility but not at the table manufacturers facility.

FIG. 15 shows still another version of the bracket shown in FIG. 14. This version of the bracket has been so designed as to permit the slipper tray and footrest to be installed at various heights to accommodate the comfort of the patient. Also, in this version, the tray is rigidly attached to the mounting bracket in a fixed horizontal plane, since the variable height will not permit the use of the table locking spring loaded plunger.

DESCRIPTION OF THE PREFERRED EMBODIMENT

Figure 1:
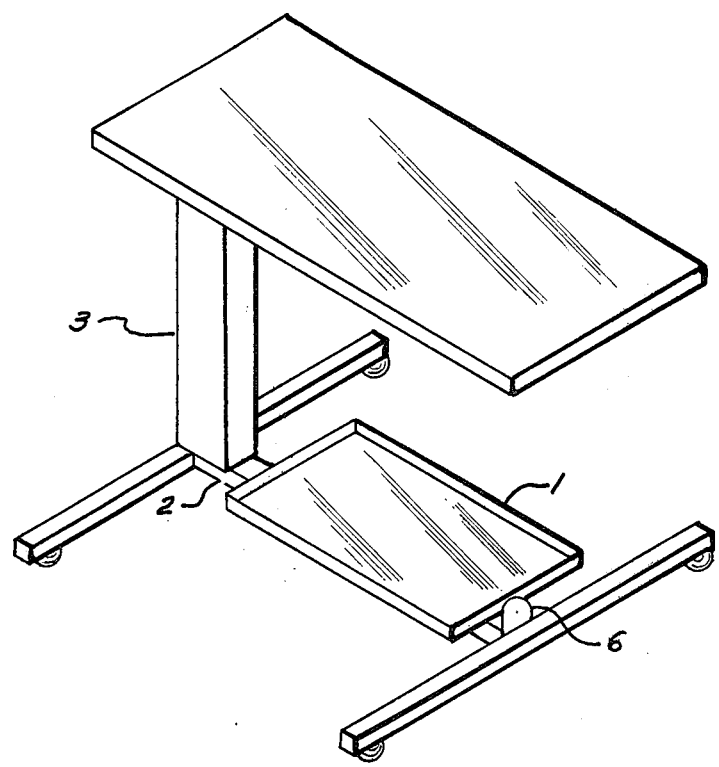
FIG. 1 is a perspective view showing one version of the over-the-bed table with an "H" shaped base with the slipper tray mounted thereon. In this perspective view, the invention is shown in the horizontal position.

Referring now to FIG. 1 of the drawing, it is seen that the subject invention, slipper tray and footrest (1) is attached to the longitudinal bar (2) of the over-the-bed table (3) by means of end brackets (6). This FIG. 1 shows the relationship of the slipper tray and footrest (1) to the overall over-the-bed table (3). Further details as to the various versions of the subject invention and methods of attachment to the over-the-bed table (3) are shown in subsequent FIGS.

FIGS. 2, 3, 4, and 5 show the details of the attachment of the slipper tray and footrest (1) to its mounting bracket (6) and the attachment of the mounting bracket (6) to the longitudinal base bar (2) of the over-the-bed table (3). FIGS. 3, 4, and 5 also show details of the spring loaded table locking plunger (14) and the detail design of the slipper tray and footrest (1).

Figure 2:
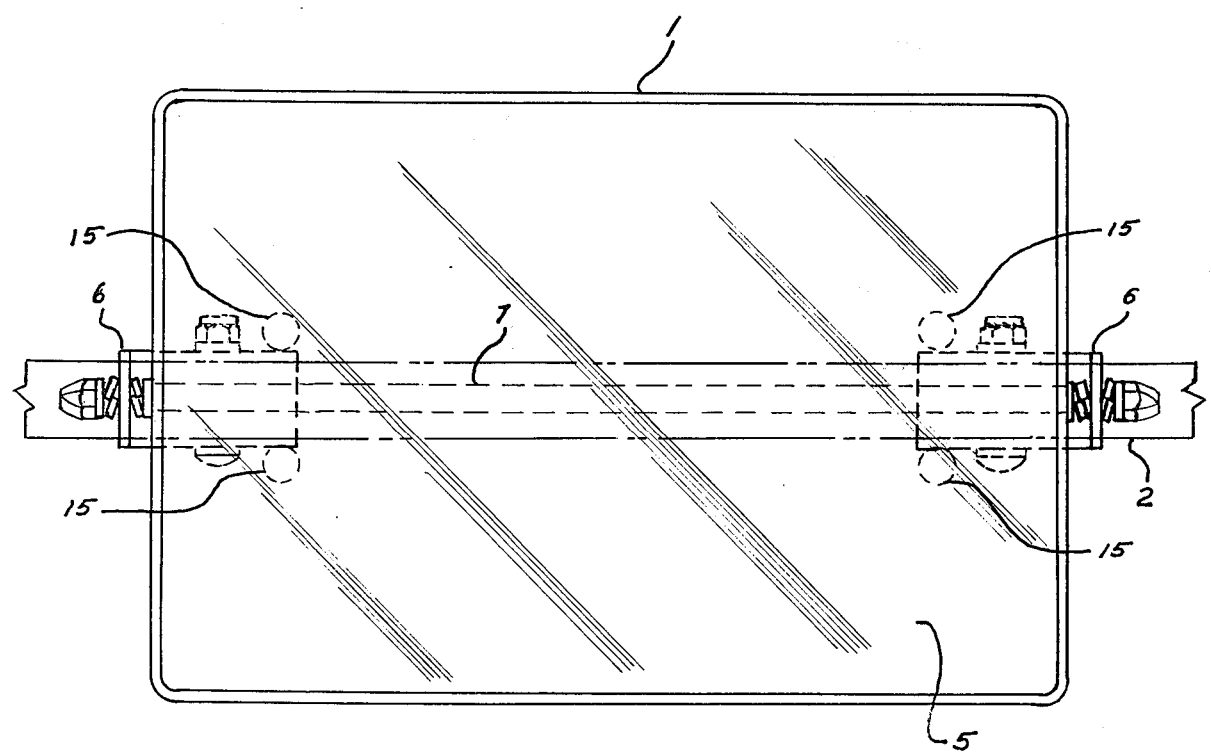
FIG. 2 is a top plan view of the slipper tray mounted on the horizontal bar of the "H" shaped base of the table. (Shown in phantom). This version of the slipper tray is constructed of a formed, welded, and burnished stainless steel pan. The edge of the pan is bent up to prevent any object mounted thereon from sliding off. The top edge of the bent up flange is covered with a rubber or vinyl molding to prevent the patient from hurting his or her self on the raw edge. The pan is welded to a pivot rod located on the bottom side of the pan on its longitudinal center line. Both ends of the pivot rod are threaded in order to allow the pan to pivot. Details of the pivot joint are shown in FIG. 5.

In FIG. 2 the longitudinal pivot bar (7) can be seen in hidden lines welded to, and along the center line of the slipper tray and footrest (1). In FIG. 2 can also be seen the two mounting brackets (6) which attach the slipper tray and footrest (1) to the over-the-bed table (3) horizontal longitudinal bar (2).

FIG. 3 shows in greater detail the construction of the slipper tray (1). The tray assembly (1) consists of the stainless steel tray (4) with the edges bent up at right angles to form a flange completely around the perifery of the tray (4). The raw edge of the flange is covered with a vinyl or rubber molding (8) to protect the patient from cutting himself or herself. The main flat portion of the tray (4) is covered with a rubber or vinyl non-skid matting (5) which is bonded to the tray (4). Also shown in FIG. 3 is the pivot rod (7) which is threaded on each end and protrudes through the two end mounting brackets (6). The slipper tray and footrest (1) is assembled to the two end mounting brackets (6) by the use of two plain washers (9), two lock washers (10) and the cap nuts (11). This is shown in greater detail in an expanded view (FIG. 5). The bracket assembly (6) at each end of the slipper tray and footrest (1) is clamped to the horizontal longitudinal bar (2) of the over-the-bed table (3) by means of the screw (12), washers (13), and locknuts (20). Attached to each of the brackets (6) are two of the spring loaded plunger assemblies (15) which locks the table in place when the slipper tray and footrest (1) is pivoted. This plunger assembly (15) consists of a plunger (14) which is contained within a cartridge consisting of the outer shell (34) and an end piece (17). The plunger (14) is normally held in the raised position against the bottom of the tray (1) by means of the springs (16). The bottom end of the plunger (14) has a rubber or vinyl cap (18) with a non-skid bottom surface which, upon contact with the floor (19) prevents the table (3) from moving due to the horizontal force fector caused by the pivoting of the tray (1).

FIG. 4 is an end view again showing the slipper tray and footrest (1) with its rubber or vinyl molding (8) and rubber or vinyl non-skid matting (5). It also shows the tray (4), mounting bracket (6) and its clamping screws (12), washers (13) and locknuts (20) which run under the longitudinal bar (2) of the over-the-bed table (3). This view also shows an end view of the pivot bar (7) with its washers (9) and (10) and cap nut (11). Especially obvious in this view are the two plunger assemblies (15) with the plungers (14) spring loaded against the bottom of the slipper tray and footrest (1). The plungers (14) have a spherical end which presses against the tray (1), thereby providing a minimum amount of friction between the plunger (14) and the tray (1) while the tray (1) is being pivoted. The rubber or vinyl non-skid end caps (18) are also shown on the bottom ends of the plungers (14). The left hand side of FIG. 4 shows in phantom what happens when the tray (1) is pivoted. In the pivoted position (21) the tray pushes down on the spring loaded plunger (14) as shown at point (22). In doing so, the plunger (14) with its non-skid cap (18) is forced down against the floor (19) and (22), thus preventing the table (3) from moving. Since the slipper tray and footrest (1) can be pivoted in either direction, a plunger assembly (15) must be attached to both sides of the mounting bracket (6). Brackets (6) with their plunger assemblies (15) are identical for both ends of the slipper tray and footrest (1) installation.

There are two advantages of the plunger assemblies (15): One is that, when not in use as a footrest, the slipper tray and footrest (1) is always maintained in a horizontal position by the equal and opposite forces being applied to the under side of the tray (1) by the two spring (16) loaded plungers (14). Secondly, the more pressure that is applied by the patient in pivoting the tray (1), the more force that is applied to the plunger (14), its non-skid cap (18) and the floor (19). Thus, reducing the chance for the table (3) sliding away due to the horizontal force vector.

FIG. 5 shows an expanded view of the slipper tray and footrest (1) pivot assembly. It also shows more clearly the bent up flange of the pan (4), the rubber or vinyl protective molding (8), the non-skid matting (5), and the pivot rod (7) with its threaded end (24). This expanded view shows the sequence of assembly of the various components that make up the pivot joint. First to be installed over the threaded end (24) of the pivot rod (7) is the plain washer (9), then the lock washer (10), the mounting bracket (6), a second lock washer (10), a second plain washer (9), and finally the cap nut (11).

This assembly sequence is typical of both ends of the slipper tray and footrest (1). The amount of force required to pivot the slipper tray and footrest (1) is adjustable by tightning or loosening the cap nuts (11). Thereby compressing or relaxing the lock washers (10). The plain washers (9) and the mounting bracket (6) flange are used as friction plates for the lock washers (10). The two lock washers (10) are installed such that their biting action is opposite from one another because of the fact that the slipper tray and footrest (1) may be rotated in either direction. Again in this view can be seen the plunger assembly (15), the plunger (14) and its rubber or vinyl cap (18).

FIG. 6 shows another version of the basic slipper tray and footrest (25) as made from a non-ferrous metal casting or plastic molding. The primary difference between this configuration (25) and the basic tray (1) is in the deletion of the rubber or vinyl protective molding (8) and the pivot rod (7), and the addition of the bosses (27) cast to the bottom side of the pan (25) to accept the threaded pivot rods (26). In addition, stiffening webs (28) have been added since castings with thin sections have a tendancy to warp. Then too, should the tray (25) be molded from plastic, the webs (28) provide additional strength since most plastics are inherently somewhat more flexible than metal.

FIG. 7 shows a side view of the cast slipper tray and footrest pan (25) with a partial sectional view showing the threaded pivot rods (26) inserted in the cast bosses (27). Also shown is the end view of the reinforcing webs (28) and the rubber or vinyl non-skid matting (5). Note the absence of the protective rubber or vinyl molding (8).

FIG. 8 is a cross section of the pan (25) showing the rubber or vinyl non-skid matting (5) and the reinforcing webbing (28).

FIG. 9 is a perspective showing the slipper tray and footrest (1) or (25) mounted on a "U" shaped tubular base (29) that is used on some versions of the over-the-bed table. The slipper tray and footrest (1) or (25) remain identical to that previously described. The mounting brackets must be modified to accomodate the tubular base (29) and the offset required to center the subject invention within the "U". This modified bracketry (30) and (31) are shown in FIGS. 10, 11, and 12.

FIG. 10 is a plan view showing the offset on the left hand side required to center the slipper tray and footrest (1) or (25) in the "U" shaped tubular base (29). The revised on-center bracket (30) at the right end is shown in more detail in FIG. 11. The offset bracket (31) is shown in greater detail in FIG. 12. The method of mounting the slipper tray and footrest (1) or (25) to the two modified brackets (30) and (31) is identical to that shown in FIG. 5.

FIG. 11 shows a side view of the on-center bracket (30). This bracket is clamped to the tubular table base (29) in a manner identical to that shown in FIG. 4. The use of the two table locking plunger assemblies (15) is also identical to that previously shown.

FIG. 12 is an end view of the offset bracket (31). This offset is made necessary as a result of the location of the upright end structure of this particular table design. In this view can be seen the slipper tray and footrest (1) or (25) mounted by the typical method of using two flat washers (9), two lock washers (10) and the cap nut (11). The two table locking plungers (15) with their non-skid caps (18) are also visable. The bracket (31) is clamped to the table base (29) by means of two sets of screws (12), washers (13), and lock nuts (20) rather than only one set as previously shown in the other FIGS. in order to compensate for the torque load caused by offsetting the pivot point.

FIG. 13 is a side view of this same bracket (31) clarifying its attachment to the table base (23).

FIG. 14 shows an entirely different bracket design (32). The slipper tray and footrest (1) or (25) attach to the bracket (32) by the same means shown in FIG. 5. Thus these details are not repeated here. Bracket (32) has been designed to be attached directly to the horizontal bar (2) of the over-the-bed table (3) by modifying the horizontal bar (2) by adding mounting holes through the bar (2) for accepting the screw (12), washers (13) and lock nut (20). This bracket (32) which would be identical at both ends of the slipper tray and footrest (1) also includes the spring loaded locking plunger assemblies (15).

FIG. 15 shows still another method of mounting the slipper tray and footrest (1). In this configuration, the slipper tray and footrest (1) is afixed (34) in a horizontal position to the bracket (33). This version of the bracket (33) is installed in a manner identical to that shown in FIG. 14. However, bracket (33) has been enlongated to accomodate additional mounting holes (35), thereby permitting the slipper tray and footrest (1) to be raised or lowered a considerable distance to suit the comfort of the patient. Since the assembly can be reised or lowered, the plunger assemblies (15) are unnecessary, nor can they be used due to the wide range of vertical motion that would be required of the plunger (14).

Having thus described the invention and its present embodiments thereof, it is desired to emphasize the fact that many further modifications may be resorted to in a manner limited only by a just interpretation of the following claims:

What I claim is:

1. A pivotable combination footrest and slipper tray attached to the base of an over-the-bed table by means of brackets attached to the ends of said footrest and slipper tray, said brackets being of such shape as to include two flanges which extend downward to enclose a structural member of the base of such over-the-bed table, screws extending through both flanges of said brackets to attach said bracket to said structural member, said screws being retained in place by means of nuts and washers, the shape of such mounting bracket being tailored to the size and shape of said structural member of the over-the-bed table, said footrest and slipper tray being made pivotable with respect to said mounting brackets and over-the-bed table by means of centrally located pivot shafts attached to the ends of said combination footrest and slipper tray and extending through vertical flanges of said mounting brackets, the ends of said pivot shafts being clamped to said vertical flanges of said brackets by means of plain washers, lockwashers, and capnuts in such a manner as to permit the footrest and slipper tray to pivot with the application of foot pressure, the amount of friction required to pivot said footrest and slipper tray being adjustable by the amount of torque applied to said capnuts and lockwashers, spring loaded plungers having non-skid end caps on their lower ends being contained within cylindrical housings attached to each side of said footrest and slipper tray mounting brackets to maintain the combination footrest and slipper tray in a horizontal position or to lock the over-the-bed table in place, said springs being compression springs and so located and loaded as to apply a force between the bottom of the cylindrical plunger housing and a flange on the plunger, said force being applied in such a manner as to force an upper spherical end of said plunger against the bottom of said footrest and slipper tray, said plungers being located on opposite sides of said footrest and slipper tray pivot point to apply spring loaded equal and opposite forces against the bottom of said tray, thereby maintaining such tray in a horizontal position, the application of pressure eccentrically about the tray pivot point and downward to the top of said footrest and slipper tray causing said tray to pivot, thereby forcing said plungers downward against the surface upon which the over-the-bed table rests, such downward pressure creating friction between the plunger and said surface thereby locking the over-the-bed table in place and preventing said table from moving, the footrest and slipper tray being pivotable either clockwise or counter clockwise about its pivot point causing the over-the-bed table to be locked in place with the application of said pressure on either side of said pivot point.

* * * * *